United States Patent [19]

Shultz et al.

[11] 4,060,997

[45] Dec. 6, 1977

[54] WATER CHILLER CONTROL

[75] Inventors: Gilbert F. Shultz, Novi; Ronald W. Bailey, Westland, both of Mich.

[73] Assignee: Application Engineering Corporation, Elk Grove Village, Ill.

[21] Appl. No.: 672,255

[22] Filed: Mar. 31, 1976

[51] Int. Cl.² ............................................. F25D 17/02
[52] U.S. Cl. ...................................... 62/180; 62/185; 165/31
[58] Field of Search ................. 62/208, 228, 185, 180, 62/435, 196 C; 236/15 BF, 78 A; 165/31

[56] References Cited

U.S. PATENT DOCUMENTS

| | | | |
|---|---|---|---|
| 2,222,989 | 11/1940 | Robb | 62/185 X |
| 3,214,660 | 10/1965 | Smoot | 236/78 A X |
| 3,498,075 | 3/1970 | Zumbiel | 62/228 X |
| 3,616,846 | 11/1971 | Wills | 236/78 A X |

*Primary Examiner*—William E. Wayner
*Attorney, Agent, or Firm*—Kinzer, Plyer, Dorn & McEachran

[57] ABSTRACT

A control system for a water chiller comprising a heat exchanger, a pump for circulating a coolant comprising water or other process fluid through a path including the heat exchanger, a process apparatus, and a reservoir, and a compressor for circulating refrigerant through a path including the heat exchanger and a condenser; the control system includes electronic sensors for sensing the water supply pressure to the process apparatus, the refrigerant pressures at the compressor inlet and outlet, the water level in the reservoir, and the water temperatures at the heat exchanger inlet and outlet. The control system further includes logic and control circuits which de-activate the pump for conditions of inadequate (or excessive) water pressure or inadequate water in the reservoir, which vary the refrigerant circulation to maintain the water temperature essentially constant at a preset level, and which protect the chiller against over or under-pressure refrigerant conditions and against excessive cooling, affording precision control and continuous monitoring of all chiller operations.

16 Claims, 4 Drawing Figures

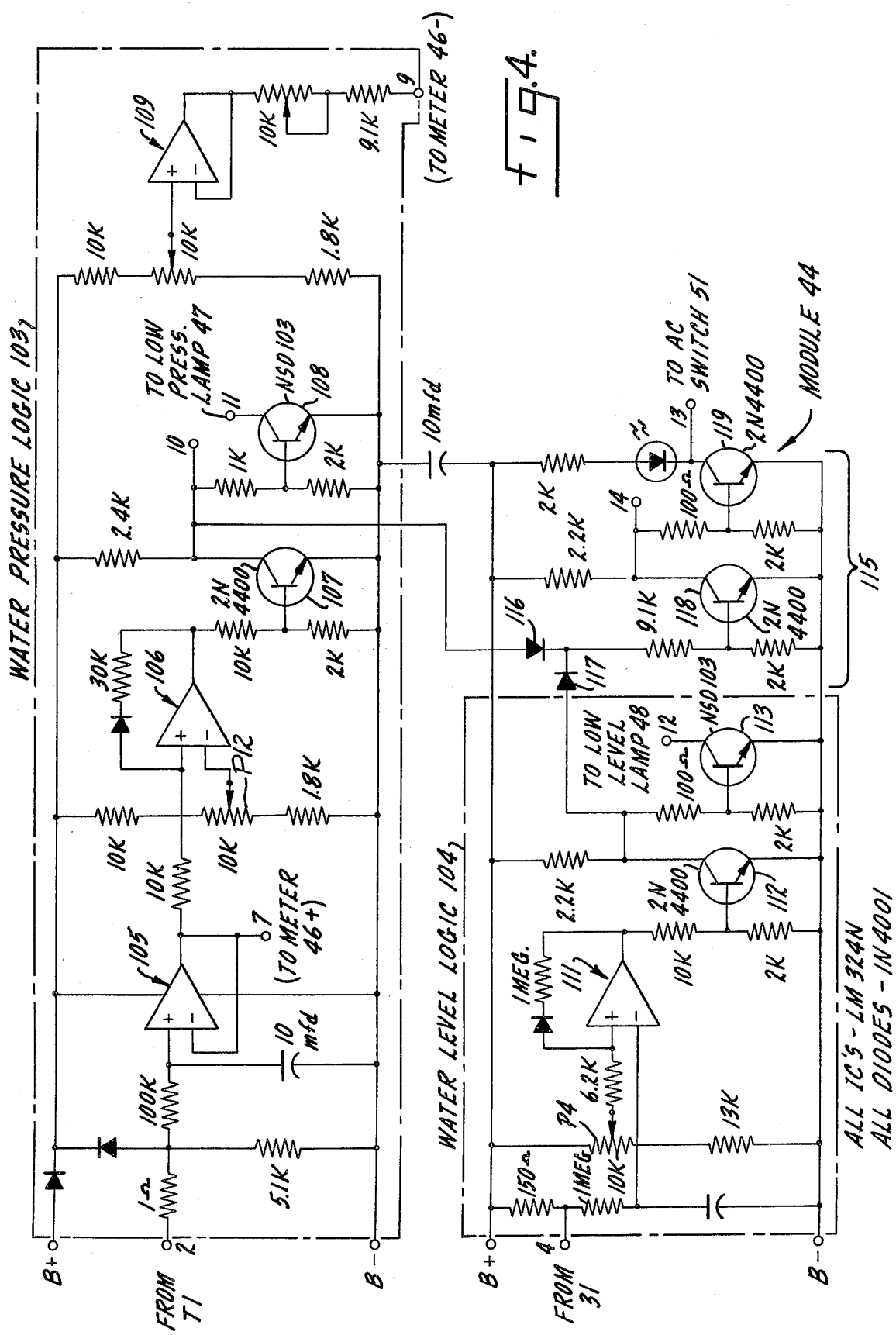

WATER CHILLER CONTROL

BACKGROUND OF THE INVENTION

There are many industrial processes and applications that require a continuous supply of a process fluid used for cooling purposes. The devices used to furnish this process fluid supply are ordinarily called "water chillers", even though the process fluid is most usually a mixture of water and other liquid, usually ethylene glycol, and that term is used in this specification to refer to controlled chillers using any appropriate coolant.

A water chiller must maintain the temperature of the process fluid essentially constant within a very limited tolerance range; in some instances the critical parameter may be selected as the return temperature from the process apparatus, but more frequently the supply temperature should be selected as the basis of control. The water chiller is often a self-contained unit that can be transported from one location to another, literally constituting a heat transfer system on wheels. Water chillers of this kind are most frequently employed in processes involving heat transfer where the coolant must be maintained constant at some temperature between $-30°$ F and $+60°$ F.

For the most part, the controls for water chillers have constituted conventional thermostats, freezestats, and pressure-actuated switches connected directly in the electrical actuating circuits of the pumps, compressors, and other components of the water chilling apparatus. A further control that is often used is a float switch, connected to a coolant reservoir, employed to interrupt operation whenever the water supply is inadequate. Another control frequently used is a hot-gas bypass valve, used to control cooling capacity during intermittent or partial load conditions.

For many applications, these direct acting controls are adequate. However, they do not afford the precision control essential to some sensitive manufacturing and other industrial operations. Furthermore, controls of this nature do not provide comprehensive protection for the water chiller and the process apparatus it serves relative to possible malfunctions in the chiller itself or in the process apparatus. Moreover, the inherent inertia of these conventional controls makes it difficult to control chiller operation on the basis of coolant supply temperature; it is usually necessary to use the coolant return temperature as the control parameter.

SUMMARY OF THE INVENTION

It is an object of the present invention, therefore, to provide a new and improved water chiller control that affords improved sensitivity and precision of control and that also provides improved protection for the water chiller and the process apparatus served by the water chiller, utilizing a limited number of electronic sensors to detect variations in different operating conditions of the chiller.

A more specific object of the invention is to provide a new and improved water chiller control in which a single thermal sensor for return temperature provides effective thermal control and also serves to protect the chiller against freeze-up and other abnormal temperature conditions.

Another object of the invention is to provide a new and improved water chiller control that effectively protects the water chiller against abnormal pressure conditions in the process fluid (coolant) circulation path.

A further object of the invention is to provide a new and improved water chiller control that affords effective protection to the water chiller against the occurrence of abnormal pressure conditions in the refrigerant circulation path of the chiller.

A specific object of the invention is to provide a new and improved electronic control for a water chiller that is simple and inexpensive in construction, reliable in operation, and substantially more precise in its control functions than previously known control systems.

Accordingly, the invention relates to a control incorporated in a water chiller comprising a principal heat exchanger having first and second separate fluid paths extending therethrough in heat-exchanging relationship, pump means for circulating process fluid through a process fluid path including, in series, a process apparatus and the first heat exchanger path, and compressor means for circulating a refrigerant fluid through a refrigerant path including, in series, a condenser and the second heat exchanger path. The control system comprises a process fluid pressure sensor, a process fluid temperature sensor, and a refrigerant pressure sensor; each sensor developes an electrical parameter sigal having an amplitude indicative of the operating parameter sensed. A process fluid pressure reference circuit, a process fluid temperature reference circuit, and a refrigerant pressure reference circuit are included in the control system, together with a process fluid pressure comparator means, a process fluid temperature comparator means, and a refrigerant pressure comparator means. Each reference circuit develops a reference signal representative of a predetermined value for the reference parameter, and each comparator means compares its parameter signal with the related reference signal to develop a cut-off signal indicative of a deviation of its parameter signal in a given sense from the related reference signal. Control circuit means, coupled to each of the comparator means and to the compressor means, deactivates the compressor means in response to any of the cut-off signals and shuts down the pump means in response to either of the process fluid cut-off signals.

BRIEF DESCRIPTION OF THE DRAWINGS

FIG. 4 is a detailed circuit diagram of another logic unit for the control system of FIG. 2, relating to logic circuits used for water pressure and water level control but also applicable to refrigerant pressure control.

DESCRIPTION OF THE PREFERRED EMBODIMENT

Figure 1:
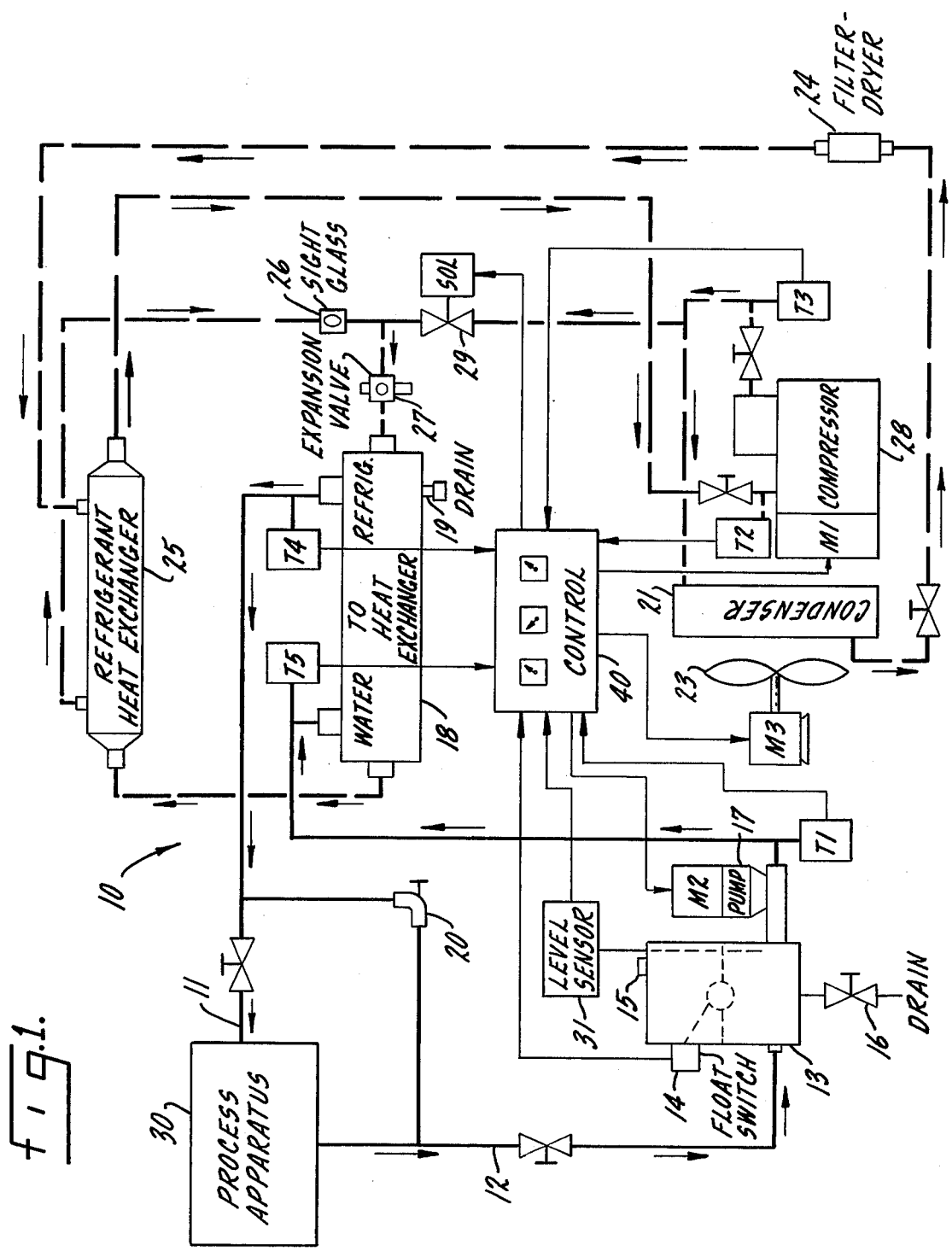
FIG. 1 is a schematic diagram of a water chiller generally illustrating the location of sensors for a control constructed in accordance with the present invention.

FIG. 1 affords a schematic illustration of a water chiller 10 that is essentially conventional in construction except for the control sensors incorporated in the chiller. Water chiller 10 includes a process fluid path comprising a supply connection 11 connected to an external process apparatus 30. From process apparatus 30 the process fluid path continues to a return connection 12 connected to the inlet of a reservoir tank 13. Tank 13 is equipped with a float switch 14, a fill and vent connection 15, and a drain 16. The outlet of tank 13 is connected to a pump 17 that circulates the water through the process fluid path. The process fluid path continues from pump 17 to the water inlet of a refrigerant-to-water heat exchanger 18. The process fluid path continues through heat exchanger 18 and back to the supply connection 11. Heat exchanger 18 may be provided with a drain 19.

Water chiller 10 further comprises a refrigerant circulation system including a compressor 28. The refrigerant circulation path extends from the outlet of compressor 28 to a condenser 21. Condenser 21, in the particular construction shown for chiller 10, is an air cooled condenser incorporating a fan 23. However, a water cooled condenser could be used if desired.

From condenser 21, the refrigerant path, which is shown in dash lines in FIG. 1, extends through a filter-dryer 24 to a refrigerant heat exchanger 25 which constitutes a liquid-to-gas suction line heat exchanger. From heat exchanger 25, the refrigerant path extends through a sight glass 26 to an expansion valve 27 that is connected to the inlet to a second fluid path through the principal heat exchanger 18. From heat exchanger 18, the refrigerant path extends back to heat exchanger 25 and thence to the inlet of compressor 25. An unloader valve 29 is connected between the outlet of compressor 28 and the inlet of heat exchanger 18, in a branch of the refrigerant path.

Compressor 28 is driven by an electrical motor M1, pump 17 is driven by an electrical motor M2, and fan 23 is powered by an electrical motor M3. Valve 29 is actuated by a solenoid SOL.

As thus far described, water chiller 10 is entirely conventional in construction. Warm process fluid, usually water and ethylene glycol, is returned from process apparatus 30, through return connection 12, to reservoir tank 13. The water is pumped from reservoir 13 by pump 17 and through one path through the principal heat exchanger 18, where it is cooled to a predetermined temperature before being supplied to process apparatus 30 through supply connection 11. A chilled water bypass 20 may be provided between the supply line 11 and the inlet 12 to reservoir tank 13 to assure a constant flow during intermittent fluctuating load conditions.

In the refrigerant path of chiller 10, liquid refrigerant from condenser 21 passes through filter-dryer 24, which removes water or other contaminants. The liquified refrigerant then passes through heat exchanger 25 before entering the thermal expansion valve 27, where the refrigerant commences to expand. Expansion continues inside heat exchanger 18. In heat exchanger 18, the expansion of the refrigerant to its gaseous state extracts process heat from the water that also passes through the heat exchanger.

The expanded and heat-laden refrigerant gas is then passed back through a second path in heat exchanger 25 to the inlet of compressor 28, with a limited portion of the heat being removed in heat exchanger 25. Compressor 28 functions in the usual manner to compress and circulate the refrigerant, supplying the refrigerant as a gas under pressure to condenser 21 where the refrigerant is liquified. Unloader valve 29, connected between the refrigerant inlet of heat exchanger 18 and the outlet of compressor 28, controls the cooling capacity of chiller 10.

The control system for chiller 10 comprises five electronic transducers or sensors T1 through T5, all of which have electrical outputs connected to a main control circuit 40. Transducer T1 is a water pressure sensor that is connected to the process fluid path between pump 17 and supply outlet 11, preferably at the pump outlet as shown in FIG. 1. Sensor T1 develops an electrical water pressure signal having an amplitude indicative of the process fluid supply pressure to apparatus 30.

Transducer T2 is also a pressure sensor and is connected to the inlet of compressor 28. Sensor T2 develops an electrical signal having an amplitude indicative of the refrigerant pressure at the compressor inlet. Transducer T3 is also a pressure sensor, similar to transducer T2, that is connected to the compressor outlet and develops an electrical signal having an amplitude indicative of the refrigerant pressure at the compressor outlet.

Transducer T5 is an electronic temperature sensor that is connected to the inlet to heat exchanger 18. Thus, sensor T5 is located on the return side of the water circulation path through chiller 10 and develops an electrical signal having an amplitude representative of the return temperature of the circulating water or other coolant. Transducer T4 is a similar thermal sensor that is connected to the outlet of heat exchanger 18 and develops an electrical signal having an amplitude indicative of the temperature of the water or other process fluid supplied to apparatus 30. All of these signals are applied to control circuit 40.

An additional sensor may be incorporated in the control for water chiller 10, comprising a level sensor 31 mounted on tank 13. Sensor 31 develops an electrical signal having an amplitude indicative of the level of water or other coolant in reservoir tank 13. This signal is also supplied to control circuit 40. In addition, float switch 14 is electrically connected to the control circuit. Electrical energizing circuits are provided from control unit 40 to each of the three motors M1, M2 and M3 that actuate compressor 28, pump 17, and fan 23 respectively, and to the solenoid SOL for valve 29.

Figure 2:
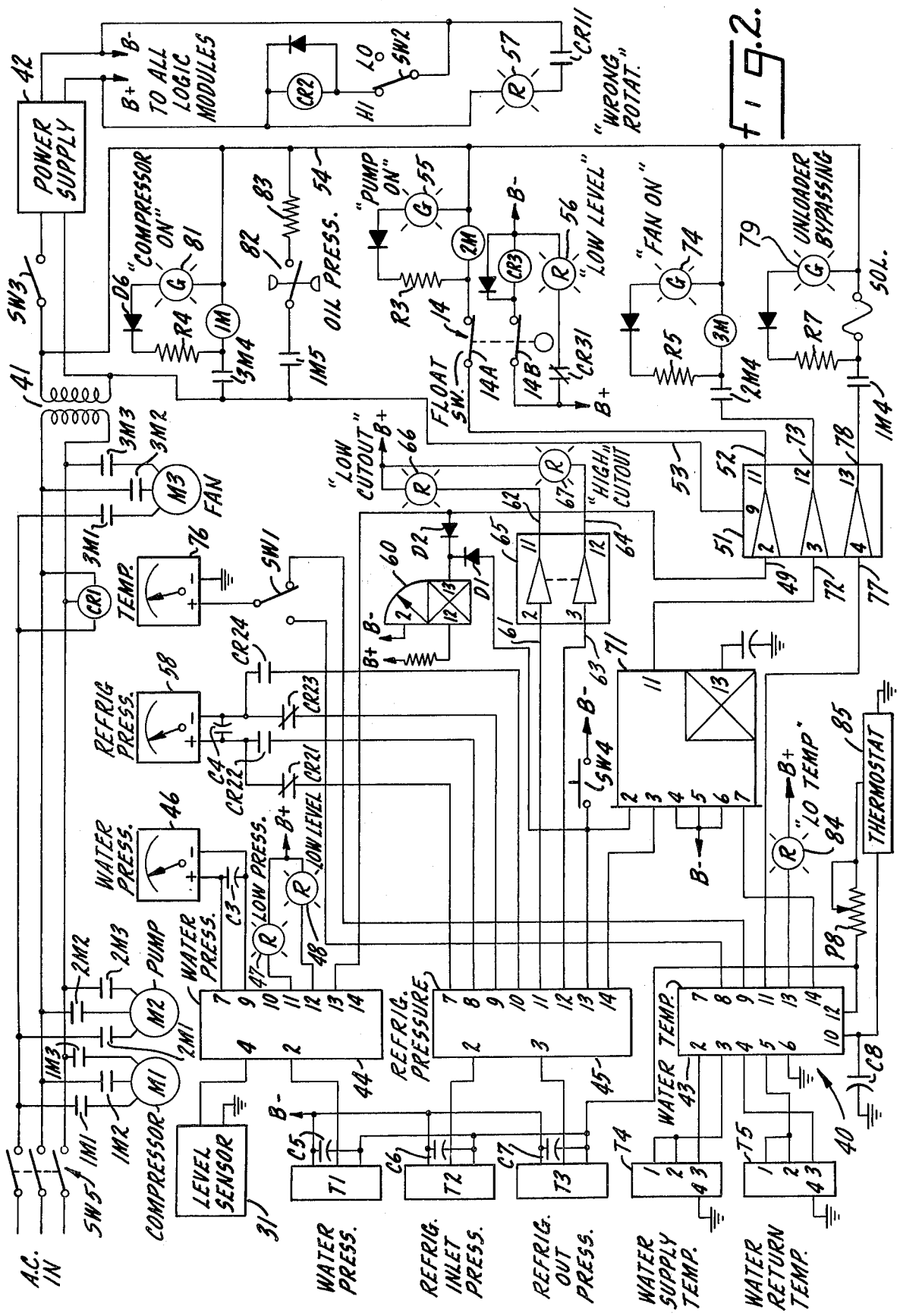
FIG. 2 is a schematic circuit diagram of a water chiller control system constructed in accordance with a preferred embodiment of the present invention.

A preferred embodiment of control circuit 40 is shown in substantial detail in FIG. 2. As shown therein, compressor motor M1 is connected to a three-phase AC supply line by three sets of contacts 1M1, 1M2, and 1M3. Pump motor M2 is similarly connected to the three-phase AC supply by three sets of contacts 2M1, 2M2 and 2M3. The fan motor M3 is connected to the three-phase supply by appropriate contacts 3M1, 3M2 and 3M3. The three-phase AC supply is also connected to a phase-sensing relay coil CR1 used to control energization of a "wrong rotation" indicator lamp by actuation of the relay contacts CR11. One phase of the AC supply energizes a stepdown transformer 41 that is connected to a power supply circuit 42 through a switch SW3. Power supply 42 may be of conventional construction, including an internal stepdown transformer, rectifier, and voltage regulator, affording two DC operating voltages B+ and B− that are connected to all of the logic modules in circuit 40, these power supply connections not being shown in detail. For the specific circuits of FIGS. 3 and 4, the DC supply voltages are ±24v and OV.

Control circuit 40 includes three principal logic modules, comprising a water temperature control module 43, a water pressure control module 44, and a refrigerant pressure control module 45. Level sensor 31 is electrically connected to one input of the water pressure logic module 44 and the water pressure sensor T1 is electrically connected to a second input to module 44. Module 45 also has two inputs, one derived from the refrigerant inlet pressure sensor T2 and the other from the refrigerant outlet pressure sensor T3. Similarly, there are two inputs to the water temperature logic module 43, one from the water supply temperature sensor T4 and the other from the water return temperature sensor T5.

Control circuit 40 includes a water pressure meter 46 having two input terminals that are connected to two output terminals of the water pressure logic module 44. Another output from module 44 is connected to a low water pressure warning lamp 47 that is returned to the B+ supply. A further output from module 44 is connected to a low water level warning lamp 48 that is also returned to the B+ supply. In addition to these indicator outputs from logic module 44, there is a control output from module 44 that is connected to one input 49 of a triple AC switch unit 51; unit 51 has an AC input connection 53 from one side of the secondary of transformer 41. The output 52 of this section of the triple AC switch 51 is connected to one side 14A of the float switch 14, shown in FIG. 2 as a double-pole single-throw switch. The other terminal of switch section 14A is connected to a motor contactor coil 2M that is returned to an AC line 54 connected to the other side of the secondary of transformer 41. A "pump ON" indicator lamp 55 is connected in parallel with coil 2M, the lamp circuit including a current-limiting resistor and protective diode.

The other section 14B of float switch 14 has one side connected to the B+ supply and the other side connected to a control relay coil CR3 that is returned to the B− supply, a protective diode being connected in parallel with coil CR3. A low level warning lamp 56 is connected from the B− supply to the B+ supply in a circuit that includes, in series, a pair of normally closed relay contacts CR31 that are actuated by coil CR3.

Control circuit 40 further comprises a refrigerant pressure meter 58. The plus input terminal of meter 58 is connected to one output of the refrigerant pressure logic module 45 through a pair of normally-closed control relay contacts CR21 and is connected to a second output of module 45 through a pair of normally-open relay contacts CR22. The minus input terminal to meter 58 is connected to a further output of the refrigerant pressur logic module 45 through a pair of normally-closed control relay contacts CR23 and is also connected to an additional output of module 45 through a pair of normally-open relay contacts CR24. Contacts CR-<-CR24 are actuated by a coil CR2 connected across the DC power supply in series with a high-low selector switch SW2.

The refrigerant pressure logic module 45 has two additional outputs respectively connected to the inputs 61 and 63 of a dual DC switch unit 65. The output of switch unit 65 associated with input 61 is connected to a low refrigerant pressure cut-out warning lamp 66 that is returned to the B+ supply. The output 64 of switch unit 65 that is associated with input 63 is connected to a high pressure cut-out warning lamp 67 that is also returned to the B+ supply.

In addition to the indicator and metering outputs described above, the refrigerant pressure logic module 45 has two control outputs (pins 13 and 14) which are connected to two separate inputs of a multiple-input AND gate 71. AND gate 71 also receives an additional control input from the water temperature control module 43 (pin 14). Gate 71 has an output connection to an input terminal 72 of the triple AC switch 51.

The output terminal 73 of switch unit 51 that is associated with input terminal 72 is connected through a pair of normally-open contacts 2M4, actuated by the motor contactor coil 2M, to a motor contactor actuating coil 3M that is returned to the AC line 54. A "fan ON" indicator lamp 74 is connected in parallel with coil 3M in a circuit that includes a protective diode and current-limiting resistor.

A delay timer 60 is connected to pin 13 of module 45 and pin 2 of AND gate 71 to afford an enabling input to the AND gate for a limited time interval upon startup of control 40. Timer 60 is also connected to the circuit that links module 44 to section 49, 52 of the triple AC switch 51. Timer 60 serves only to provide enabling inputs to AND gate 71 and AC switch section 49, 52 that preclude premature operation of the low pressure (process fluid and refrigerant) safety circuits of control 40 during startup of chiller 10. A switch SW4 connected from pin 13 of module 45 to the B− supply allows for manual override of the low pressure refrigerant safety circuit.

A water temperature meter 76 is incorporated in control circuit 40. The negative input terminal of meter 76 is connected to system ground. The positive input terminal of this meter is connected to a single-pole double-throw switch SW1. The two poles of switch SW1 are connected to two different output terminals (pins 8 and 9) of the water temperature logic module 43.

The water temperature logic module 43 has another control output (pin 11) that is connected to an input terminal 77 of the triple AC switch unit 51. The associated output terminal 78 is connected to the solenoid SOL through a pair of normally-open contacts 1M4, the solenoid being returned to the AC line 54. An "unloader bypassing" indicator lamp 79 is connected in parallel with solenoid SOL, with an appropriate current-limiting resistor and protective diode connected in the lamp circuit. Solenoid SOL actuates hot gas unloader bypass valve 29 (FIG. 1).

The motor contactor operating coil 1M that actuates the contacts 1M1 through 1M4 is connected in an AC energizing circuit between the low voltage AC lines 53 and 54, this circuit including, in series, a pair of normally open contacts 3M4 actuated by the fan motor contactor coil 3M. A "compressor ON" indicator lamp 81 is connected in parallel with coil 1M. A pair of normally open contacts 1M5 actuated by coil 1M is connected in a crankcase heater circuit for compressor 28 that includes an oil pressure sensing switch 82 and a crankcase heater 83.

The water temperature control logic module 43 includes an additional output (pin 13) employed to energize a low temperature indicator lamp 84, the lamp circuit being returned to the B+ supply. In addition, two terminals (pins 10, 12) of module 43 are connected to a settable thermostat 85 that is used to preset the desired operating temperature for the water or other coolant supplied by chiller 10 to process apparatus 30 (FIG. 1). A bias potentiometer P8 is connected in series between thermostat 85 and one terminal of module 43. A connection from potentiometer P8 is also made to each of the transducer T1 through T3.

Figure 3:
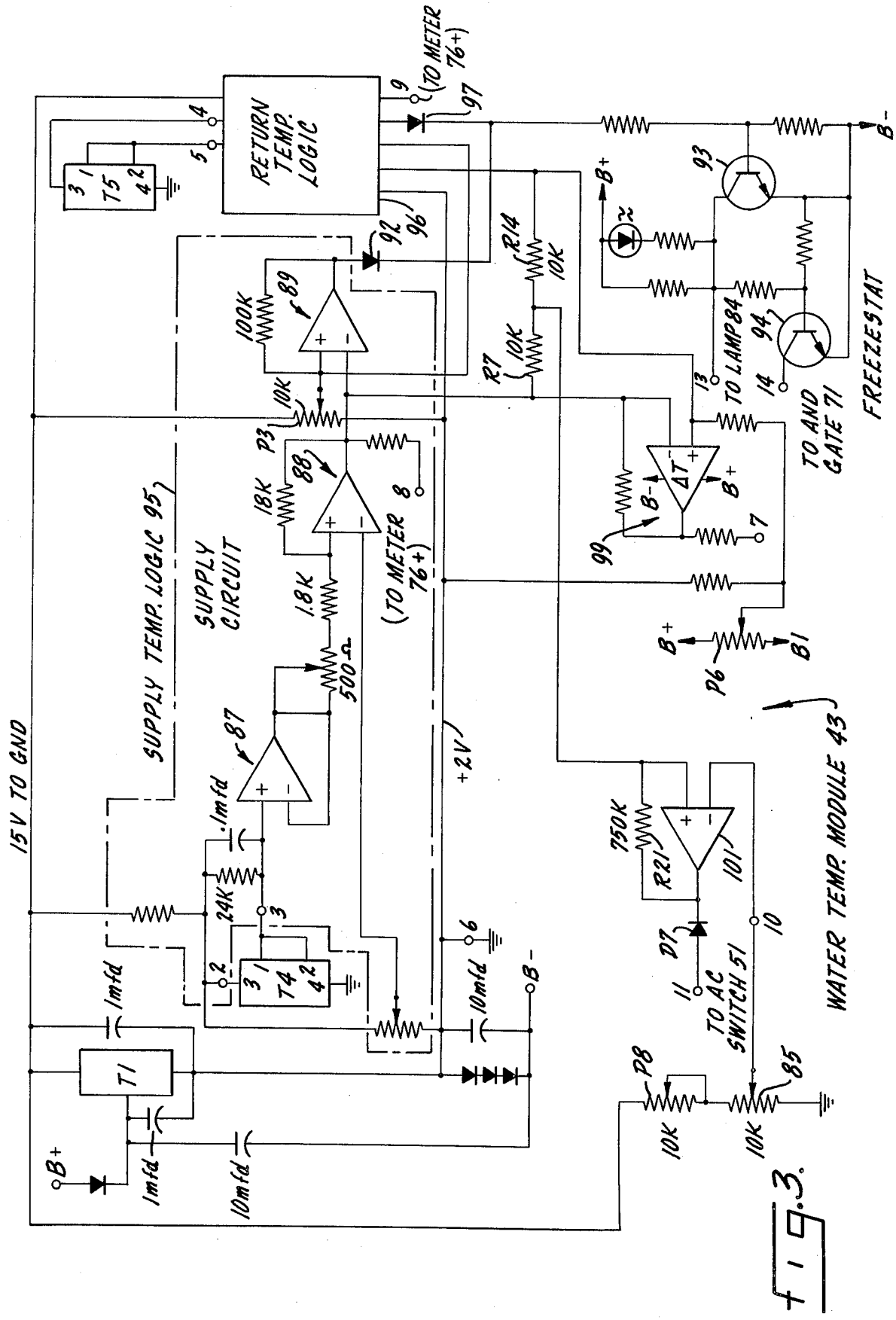
FIG. 3 is a schematic circuit diagram of a water temperature control logic unit for the control system of FIG. 2.

Before discussing the overall operation of control 40, as illustrated in FIG. 2, consideration may be given to logic circuits suitable for the principal control modules 43, 44 and 45. FIG. 3 illustrates a suitable operating circuit for the water temperature logic module 43. In FIG. 3, the pin identification members correspond to the pin members shown for module 43 in FIG. 2.

For the circuit illustrated in FIG. 3, transducer T4 is assumed to be a National Semiconductor electronic sensor Type LX 5600 having an output comprising a DC signal that varies in amplitude in proportion to changes in the temperature of the process fluid as supplied to apparatus 30 (FIG. 1). This process fluid supply temperature signal is applied to pin 3 of module 43 as an input of a buffer amplifier 87 having approximately unity gain. The output of amplifier 87 is in turn applied to an inverting current amplifier 88, the output of amplifier 88 being connected to the positive input terminal of meter 76 through module pin 8. The output of inverter 88 is also supplied to one input of a Schmitt trigger amplifier 89 used as a comparator, the other input to comparator 89 being a preset DC voltage determined by the setting of a potentiometer P3. The output of comparator amplifier 89 is supplied, through a diode 92, to the base electrode of a transistor 93 serving as an output amplifier for energization of the low temperature warning lamp 84 (through pin 13). The output of this amplifier is also used to drive a further inverting amplifier stage comprising a transistor 94, the output of which (module pin 14) is supplied to AND gate 71.

In FIG. 3, phantom outline 95 encloses the process fluid supply temperature logic for module 43, actuated by sensor T4. This circuitry 95 is duplicated in a process fluid return temperature logic unit 96 actuated by sensor T5. Logic unit 96 affords an alternative output, through a diode 97, to the "freezestat" output circuits comprising transistors 93 and 94. Logic circuit 96 has an output pin 9, corresponding to pin 8 in logic circuit 95, that is connected to meter 76 through switch SW1 (see FIG. 2).

The output of inverter amplifier 88 in the supply temperature logic circuit 95 (FIG. 3) is connected to one input of a differential temperature (ΔT) amplifier circuit 99. The corresponding point in the return temperature logic circuit 96 is connected to the other input of amplifier 99. Amplifier 99 affords an output signal, at module pin 7, indicative of the differential between the return and supply temperatures for the process fluid supplied from chiller 10 to process apparatus 30 (FIG. 1). Pin 7 of module 43 may be connected to a suitable meter (not shown) affording a direct readout of the supply-return temperature differential in those instances in which it may be critical. Alternatively, the output of amplifier 99 may be used as a control signal to modify the cooling operation of the chiller. A zero point for operation of amplifier 99, to establish the polarity of the output relative to a fixed value, can be adjusted by means of a potentiometer P6.

The two temperature signals supplied from logic circuits 95 and 96 to the ΔT amplifier 99 are also connected to one input of an amplifier 101 through a summing circuit comprising two resistors R7 and R14. The other input to amplifier 101 is derived from thermostat 85. A feedback resistor R21 is connected from the output of amplifier 101 back to the plus input and a diode D7 connects the output of the amplifier to module pin 11, which is connected to AC switch 51 (see FIG. 2). In the illustrated configuration for module 43, thermal control is effected equally on the basis of variations in the supply and return temperatures. For operating thermal control based solely upon the process fluid supply temperature, the connection from logic circuit 95 to amplifier 101 comprising resistor R14 is omitted. For thermal control based solely upon the return temperature, the circuit connection comprising resistor R7 is eliminated.

FIG. 4 illustrates suitable operating circuits for the water pressure control module 44, which is also responsive to changes in level of the water or other process fluid in reservoir 13 (FIG. 1). In FIG. 4, the water pressure logic circuits are enclosed in outline 103 and the water level logic circuits are enclosed in outline 104.

The water pressure logic 103, FIG. 4, comprises an integrating buffer amplifier 105 which receives an input signal (pin 2) from the water pressure transducer T1, in this instance a National Semiconductor Type LX1420 electronic sensor. The output of buffer 105 is applied to one input of a Schmitt trigger amplifier 106 in which the water pressure signal developed by the transducer is compared with a fixed voltage, taken as a low pressure cutout voltage, determined by the setting of a potentiometer P12. The output of the water pressure signal amplifier 105 is also connected (pin 7) to the positive terminal of meter 46.

The output of comparator amplifier 106 is applied to the base of a transistor 107. An output signal from the collector of transistor 107 is applied to another transistor 108 that supplies an actuating signal (pin 11) to low pressure cutout lamp 47 (see FIG. 2). To complete the process fluid pressure monitoring circuits 103 for module 44, a bias circuit comprising an amplifier 109 is provided. The output of amplifier 109 (pin 9) is connected to the negative terminal of meter 46.

The water level logic circuits 104 of module 44 (FIG. 4) comprise a Schmitt trigger comparator amplifier 111 having a variable input derived from level sensor 31, through an integrating circuit, and a fixed input determined by the setting of a potentiometer P4. Comparator 111 provides a significant output signal only when the water level in the reservoir falls below a predetermined value. This signal is applied to an output circuit comprising two series-connected transistors 112 and 113, the collector of transistor 113 being connected (pin 12) to the low level indicator lamp 48.

The cutout signals from water pressure logic 103 and water level logic 104 are applied to an AND circuit 115 that supplies an enabling signal (pin 13) to AND gate 71 (see FIG. 2). As shown in FIG. 4, AND circuit 115 comprises a diode 116 connected to the collector of transistor 107 in water pressure logic circuit 103 and a diode 117 connected to the collector of transistor 112 in water level logic circuit 104. Diodes 116 and 117 are connected together in a circuit that drives an amplifier comprising two series stages including a transistor 118 and a transistor 119; pin 14 of module 44 is connected to the collector of transistor 118.

To place control 40 in operation (FIG. 2) the main power switch SW5 is closed and the power supply switch SW3 is also closed. This energizes power supply 42 to afford a DC supply, B+ and B−, to logic modules 43–45 and to the other components of the control system. If the phase sequence is incorrect, so that motors M1-M3 would be driven in the wrong direction, the directional relay coil CR1 is energized, closing contacts CR11 and energizing the "wrong rotation" warning lamp 57. This informs the system operator that steps must be taken to change the phase sequence so that the motors will run in the correct direction. Shortly after switching SW3 is closed, timer 60 times out, so that the control can function with full effectivenss. Timer 60 is utilized only to inhibit the safety circuits of control 40 for a brief interval on start-up so that the safety circuits will not preclude normal operation of chiller 10.

In the course of normal operation, the process fluid supply temperature sensed by transducer T4 (FIGS. 2 and 3) may fall below the preset temperature determined by the settings of thermostat 85 and potentiometers P1 and P8 (FIG. 3). It should be noted that potentiometers P1 and P8 constitute calibration devices that are not adjusted for desired changes in the operating temperature of chiller 10; changes of this kind are established by adjustment of thermostat 85. When the process fluid supply temperature falls below the preset level, comparator amplifier 88 (FIG. 3) produces an output signal that is applied to amplifier 101 through the circuit comprising resistor R7, and amplifier 101 supplies an actuating signal to section 77, 78 of AC switch 51 (FIG. 2) to energize the solenoid SOL and open and unloader valve 29 (FIG. 1). With valve 29 open, hot gas is supplied directly to the refrigerant path input for heat exchanger 18, rapidly reducing the cooling effect of the heat exchanger and thus increasing the supply temperature of the process fluid to apparatus 30.

Conversely, as soon as the transducer T4 senses an increase of the process fluid supply temperature to a level above the setting of thermostat 85, the output signal from comparator 88 (FIG. 3) is interrupted and the actuating signal to switch 51 from amplifier 101 (pin 11 of module 43) is similarly interrupted. As a consequence, switch section 77, 78 of switching unit 51 (FIG. 2) closes, de-energizing solenoid SOL so that unloader valve 29 closes. This closes off the supply of hot refrigerant gas to heat exchanger 18, the heat exchanger being restored to full refrigerating action with only an input of liquified refrigerant through expansion valve 27 from condenser 21. By opening and closing solenoid valve 29 under the control of the supply temperature logic circuits 95 of module 43, precise control of the process fluid temperature is exercised, based upon the process fluid supply temperature.

The process fluid return temperature monitored by transducer T5 exercises a corresponding control over the operation of unloader valve 29, through the functioning of the return temperature logic circuits 96, which correspond to the supply temperature logic circuits 95 (FIG. 3). For an excessive return temperature, the output from logic circuits 96 to amplifier 101 through resistor R14 is at a level that does not produce an actuating signal (pin 11, module 43) sufficient to open section 77, 78 in the AC switch unit 51 (FIG. 2). When the return process fluid temperature falls below the desired level, however, the output from logic unit 96 actuates amplifier 101 to afford a signal at terminal 11 of module 43 which opens the AC switch section 77, 78 to energize solenoid SOL and open the unloader valve 29 to inhibit the cooling operation of heat exchanger 18. It will be seen that with the circuit of FIG. 3 resistors R7 and R14 function as a summing circuit so that control of the cooling action of heat exchanger 18 is maintained as a joint function of the process fluid supply temperature and return temperature. As noted above, control can be based solely on either the supply temperature or the return temperature, when desired, by elimination of one of the two inputs to amplifier 101.

In some water chiller applications, it may be desirable to have a direct readout of the temperature differential between the process fluid supply temperature as determined by transducer T4 and logic unit 95 and the return temperature as monitored by transducer T5 and logic unit 96. A signal directly indicative of this temperature differential is available at pin 7 of module 43, the output of amplifier 99 (FIG. 3), if required. Meter 76 affords a direct readout of either process fluid supply temperature or return temperature, depending on the portion of switch SW1 (FIG. 2).

Whenever solenoid SOL is energized and valve 29 is open, the "unloader bypassing" indicator lamp 79 (FIG. 2) is also energized. Thus, the operator is informed whenever the process fluid temperature conditions are such that heat exchanger 18 is not required to cool the process fluid.

The water temperature module 43 (FIG. 3) also protects the water chiller against a possible freeze-up in the process fluid circulation path, most likely to occur in heat exchanger 18 in the event of an operational failure of valve 29. An impending freeze-up can be detected on the basis of either the supply temperature or the return temperature, and both are utilized in the illustrated circuit for module 43, based on the setting of potentiometer P3. Thus, the output signals from the supply temperature logic 95 and the return temperature logic 96, through diodes 92 and 97 respectively, may be utilized to cut off the enabling signal normally supplied to AND gate 71 (FIG. 2) from module 43 (pin 14). For incipient freezing conditions, the normal enabling output from module 43 to AND gate 71 is interrupted, thereby interrupting the normal actuating signal supplied to switch section 72, 73 of the triple AC switch unit 51, and thus de-energizing fan motor contactor coil 3M. This de-energizes fan motor M3 by opening contacts 3M1 through 3M3. At the same time, contacts 3M4 open, de-energizing contactor coil 1M so that contacts 1M1 through 1M3 also open to de-energize compressor motor M1. In addition, contacts 1M4 drop out to de-energize solenoid SOL, and contacts 1M5 open to de-energize compressor crankcase heater 83. Thus, the entire refrigerant circulation system is shut down upon occurrence of incipient freezing conditions, but the process fluid circulation system comprising motor M2 and pump 17 remains in operation, permitting the pickup of heat from process apparatus 30 and preventing a potentially damaging freeze-up. Whenever a possible freeze-up occurs, lamp 84 is energized by the output from the water temperature logic module 43 (pin 13, FIGS. 2 and 3) so that the operator is informed of the existence of this potentially damaging condition.

Process fluid pressure and level control are exercised, in control 40, by the logic circuits of module 44 (FIGS. 2 and 4). The output signal from transducer T1, as applied to terminal 2 of module 44, is a DC signal that varies in amplitude with changes in process fluid pressure. This signal is integrated and supplied from amplifier 105 to one input of amplifier 106, where it is compared with a preset pressure signal determined by the setting of potentiometer P12. As long as the actual water pressure signal input to amplifier 106 exceeds the preset value determined by potentiometer P12, the output signal from amplifier 106 maintains an enabling output to AND gate 115 through diode 116.

Similarly, a DC signal having an amplitude indicative of the water level in tank 13 is continuously supplied to comparator amplifier 111 from water level sensor 31 for comparison with a preset water level signal determined by the setting of potentiometer P4. During normal operation, with the water level above the minimum value established by potentiometer P4, comparator 111 continuously supplies an enabling input to AND gate 115 through diode 117. In consequence, the normal output from AND gate 115, at terminal 13 of the water pressure module 44, is a continuous actuating signal that maintains switch section 49, 52 of the triple AC switch unit 51 (FIG. 2) closed. As long as this operating condition is maintained, a complete energizing circuit is available for contactor coil 2M, keeping pump motor M2 energized to circulate the process fluid through the water chiller. Maintenance of this normal operating condition is indicated to the operator by indicator lamp 55.

In the event of a malfunction of pump 17 (FIG. 1) or some other portion of the process fluid circulation system such that the pressure sensed by transducer T1 falls below the preset level determined by potentiometer P12 (FIG. 4), the normal enabling signal to AND gate 115 from the water pressure logic circuit 103 is interrupted. The enabling output from gate 115 (module 44, pin 13, FIG. 4) is also interrupted and switch section 49, 52 of the triple AC switch unit 51 (FIG. 2) opens. This interrupts the energizing circuit for contactor coil 2M. Consequently, contacts 2M1 through 2M3 open, de-energizing pump motor M2 and shutting down the process fluid pump 17. The de-energization of contactor coil 2M also causes contacts 2M4 to open, breaking the energizing circuit for coil 3M and opening its contacts 3M1 through 3M3 to de-energize fan motor M3 and interrupt the operation of the compressor fan. De-energization of coil 3M also opens contacts 3M4 and interrupts the energizing circuit for coil 1M, so that contact 1M1 through 1M3 open to de-energize compressor motor M1 and shut down the compressor. Accordingly, it is seen that for a low process fluid pressure condition, the entire water chiller 10 is shut down. This same condition produces an energizing output at pin 11 of water pressure module 44 (FIGS. 2 and 4) and energizes the "low pressure" warning lamp 47 so that the operator is immediately informed as to the reason that the water chiller has stopped operation.

Similarly, a malfunction at some point in the process fluid path may cause the water level in tank 13 (FIG. 1) to drop below a safe level, a condition that is reflected in the amplitude of the signal supplied to comparator 111 (FIG. 4) from level sensor 31. When this occurs, the enabling signal to AND gate 115 through diode 117 is interrupted and the water chiller is shut down in the same manner as described above for a low pressure condition. In this instance, however, it is the "low level" indicator lamp 48 that is energized, from pin 12 of module 44 (FIGS. 2 and 4), so that the operator is immediately aware that shutdown has occurred because of an inadequate process fluid supply in the reservoir.

The water pressure meter 46 receives two inputs from module 44. One of these inputs is the actual water pressure signal, supplied to one terminal of meter 46 from pin 7 of module 44 (FIGS. 2 and 4), which varies in amplitude in accordance with fluctuations in water pressure as determined by transducer T1. The other is a bias signal determined by the settings of the potentiometers associated with amplifier 109 (pin 9 of module 44). Thus, meter 46 affords a continuous indication of the actual water pressure at the outlet of pump 17 (FIG. 1).

Float switch 14 remains closed during normal operation of water chiller 10, as indicated in FIG. 2. The float switch is used as a backup to level sensor 31. If float switch 14 opens, the energizing circuit to contactor coil 2M is interrupted and water chiller 10 is shut down completely as described above in connection with detection of a low level condition by sensor 31. In this instance, however, relay coil CR3 is de-energized, permitting the closing of its contacts CR31. Accordingly, the supplemental "low level" indicator lamp 56 is energized so that the operator is informed that the chiller has been shut down by operation of float switch 14 and is thus aware that level sensor 31 may have failed to function.

As noted above, the refrigerant pressure logic module 45 may comprise two separate logic circuits, each corresponding in construction to the water pressure logic circuits 103 of module 44 (FIG. 4). One of these logic circuits is driven by sensor T2, which may be a National Semiconductor Type LX1430; the other is driven by sensor T3, which may be a National Semiconductor Type LX1440. As long as transducer T2 senses a refrigerant pressure at the inlet to compressor 28 that exceeds a preset level, determined by the setting of a potentiometer corresponding to potentiometer P12 in FIG. 4, an enabling output is supplied to AND gate 71 (FIG. 2) from pin 13 of module 45. However, if the refrigerant pressure at the inlet to the compressor drops below the desired level, this enabling input to AND gate 71 is interrupted so that the AND gate no longer supplies an actuating signal to section 72, 73 of the triple AC switch 51. Under these circumstances, the energizing circuit for contactor coil 3M is interrupted and contacts 3M1 through 3M3 open to de-energize fan motor M3. Furthermore, contacts 3M4 also open to de-energize coil 1M, opening contacts 1M1 through 1M3 to de-energize compressor motor M1. Contacts 1M4 also open to de-energize the solenoid SOL and prevent opening of bypass valve 29. At the same time, an output signal from pin 11 of module 45, corresponding to the same terminal in circuit 103 (FIG. 4), supplies an energizing signal to the "low cut-out" warning lamp 66, through DC switch 61, 62 (FIG. 2) to inform the operator of the source of the trouble and the reason for shutdown of the refrigerant system.

The logic circuit in module 45 that is actuated by the refrigerant pressure, as sensed at the compressor outlet by transducer T3, also corresponds fully to circuit 103 (FIG. 4) except that the connections to the comparator amplifier 106 in that circuit are reversed to permit monitoring of an excessive pressure condition instead of an inadequate pressure condition. Consequently, module 45 operates to shut down the compressor and the fan upon the occurrence of an excess refrigerant pressure condition at the outlet of compressor 28 and also lights the "high cut-out" warning lamp 67 to inform the operator as to the reason for shut down of the refrigerant system.

With switch SW2 (FIG. 2) in the illustrated position, energizing coil CR2, contacts CR22 and CR24 are closed and contacts CR21 and CR23 are open. Under these circumstances, meter 58 affords a direct readout of the pressure of the refrigerant at the outlet (high) of compressor 28 (FIG. 1). Whenever the operator desires to check the refrigerant pressure at the inlet (low) side of the compressor, switch SW2 is actuated to its alternate position. This de-energizes coil CR2, closing contact CR21 and CR23 and opening contacts CR22 and CR24. This causes meter 58 to afford a direct readout of the refrigerant pressure at the inlet to the compressor.

The operation of oil pressure switch 82, controlling crankcase heater 83, is entirely conventional and hence need not be described in detail.

With the illustrated control system 40, the operation of water chiller 10 can be maintained within much closer tolerances than when conventional direct-acting thermostatic controls are employed. The electronic transducers T1–T5 are virtually inertialess, as compared with mechanical sensing devices. Thus, it is readily possible and practical to hold the process fluid temperature within a range of less than plus or minus 1° F, regardless of whether control is based upon the supply temperature, the return temperature, or a summation of both temperatures. In contrast, direct thermostatic control seldom allows for maintenance of the process fluid temperature to a tolerance of even plus or minus 2.5° F.

Control 40 affords positive protection against malfunction of virtually any portion of the chiller 10, in either the process fluid circulation path or the refrigerant circulation path. With the possible exception of float switch 14, which functions primarily as a backup to level sensor 31, there are no mechanical switching elements in the sensing or control apparatus, minimizing the possibility of failure due to aging of the sensing or control equipment. For virtually any malfunction of the water chiller, the operator is provided a direct indication of the source of the malfunction, providing a substantial saving in downtime necessary for repairs or other corrective action. Furthermore, a continuous readout is provided for all of the critical parameters affecting chiller operation. Although control 40 has been described and illustrated in terms of individualized logic circuits, it will be recognized that these can be combined in an appropriately programmed miniprocessor or other programmable computer system.

We claim:

1. In a water chiller comprising:
    a principal heat exchanger having first and second separate fluid paths extending therethrough in heat-exchanging relationship;
    pump means for circulating process fluid through a process fluid path including, in series, a process apparatus and the first heat exchanger path;
    and compressor means for circulating a refrigerant fluid through a refrigerant path including, in series, a condenser and the second heat exchanger path;
    a control system comprising:
    a process fluid pressure sensor, connected to the process fluid path, for developing an electrical process fluid pressure signal having an amplitude indicative of the pressure at a given point in the process fluid path;
    a process fluid pressure reference circuit for developing a reference signal of preset amplitude representative of a predetermined pressure;
    process fluid pressure comparator means for comparing the process fluid pressure signal and the reference signal to develop a process fluid pressure cut-off signal indicative of a deviation of the process fluid pressure in a given sense from the predetermined pressure;
    and control circuit means, coupled to the process fluid pressure comparator means and to the pump means, for deactivating the pump means in response to the process fluid pressure cut-off signal.

2. A water chiller control according to claim 1 in which the process fluid pressure sensor is connected to the process fluid path at a point intermediate the pump and the process apparatus to sense the process fluid supply pressure, and in which the process fluid pressure comparator means develops a process fluid pressure cut-off signal in response to a drop in the process fluid supply pressure below a predetermined supply pressure.

3. A water chiller control according to claim 2, in which the control circuit means further comprises means to deactivate the compressor means, in addition to the pump means, in response to the process fluid pressure cut-off signal.

4. A water chiller control according to claim 2, for a chiller which further comprises a process fluid reservoir interposed in the process fluid path between the process apparatus and the pump means, and in which the control system further comprises:
    a level sensor for developing an electrical process fluid level signal having an amplitude indicative of the level of fluid in the reservoir;
    a level reference circuit for developing a process fluid level reference signal of preset amplitude representative of a predetermined reservoir level;
    and process fluid level comparator means for comparing the process fluid level signal and the process fluid level reference signal to develop a process fluid level cut-off signal indicative of a lack of adequate fluid in the reservoir;
    the control circuit means being further coupled to the process fluid level comparator means, and including means for deactivating the pump means in response to the process fluid level cut-off signal.

5. A water chiller control according to claim 4, in which the control circuit means further comprises means to deactivate the compressor means, in addition to the pump means, in response to the process fluid pressure cut-off signal.

6. A water chiller control system according to claim 1, in a chiller which further comprises an unloader bypass path, including an electrically operated unloader valve, bypassing the condenser in the refrigerant path, the control system further comprising:
    a process fluid temperature sensor, connected to the process fluid path for developing an electrical process fluid temperature signal having an amplitude indicative of the process fluid temperature;
    a process fluid temperature reference circuit for developing a second reference signal of preset amplitude representative of a predetermined temperature;
    process fluid temperature comparator means for comparing the process fluid temperature signal and the second reference signal to develop a process fluid temperature control signal indicative of a decrease of the process fluid temperature below the predetermined temperature;
    and unloader control circuit means, coupled to the process fluid temperature comparator means and to the unloader valve, for opening the unloader valve in response to the process fluid temperature control signal.

7. A water chiller control system according to claim 6, including:
    two process fluid temperature sensors, one being a supply sensor for process fluid supplied to the process apparatus and the other a return sensor for process fluid returned from the process apparatus;
    two process fluid temperature reference circuits, one for supply and one for return;

two process fluid temperature comparator means, one for supply and one for return, thereby developing a supply temperature control signal and a return temperature control signal;

and summing circuit means for summing the two temperature control signals to develop a composite temperature control signal;

the unloader control circuit means being responsive to the composite temperature control signal.

8. A water chiller control system according to claim 7, and further comprising:

a freezestat reference circuit for developing a freezestat reference signal representative of an incipient freezing temperature for the process fluid;

and freezestat comparator means for comparing the process fluid temperature signal to the freezestat reference signal to develop a process fluid thermal cutoff signal indicative of a decrease of the process fluid temperature below the incipient freezing temperature;

the control circuit means further comprising means for deactivating the pump means and the compressor means in response to the thermal cutoff signal.

9. A water chiller control system according to claim 1, and further comprising:

a refrigerant pressure sensor, connected to the refrigerant fluid path, for developing an electrical refrigerant pressure signal having an amplitude indicative of the pressure at a given point in the refrigerant fluid path;

a refrigerant pressure reference circuit for developing a reference signal of preset amplitude representative of a predetermined pressure;

refrigerant pressure comparator means for comparing the refrigerant pressure signal and the reference signal to develop a refrigerant pressure cut-off signal indicative of a deviation of the refrigerant pressure in a given sense from the predetermined pressure;

and compressor control circuit means, coupled to the refrigerant pressure comparator means and to the compressor means, for deactivating the compressor means in response to the refrigerant pressure cut-off signal.

10. A water chiller control system according to claim 9, including:

two refrigerant pressure sensors, an inlet sensor for refrigerant returned to the compressor means and an outlet sensor for refrigerant leaving the compressor means;

two refrigerant pressure reference circuits, one for inlet and one for outlet;

two refrigerant pressure comparator means, one for inlet and one for outlet, thereby developing a refrigerant inlet pressure cutoff signal and a refrigerant outlet pressure cutoff signal;

the compressor control circuit means being responsive to each of the refrigerant pressure cutoff signals to deactivate the compressor means.

11. A water chiller control system according to claim 10, in a water chiller further comprising an unloader bypass path, including an electrically operated unloader valve, bypassing the condenser in the refrigerant path, and in which the compressor control circuit means includes means for closing the unloader valve in response to a refrigerant pressure cutoff signal of given amplitude, a refrigerant pressure cutoff signal of a different amplitude serving to deactivate the compressor means.

12. A water chiller control system, according to claim 9, in which the control circuit means further comprises means to deactivate the compressor means, in addition to the pump means, in response to the process fluid pressure cut-off signal.

13. A water chiller control according to claim 12, for a chiller which further comprises a process fluid reservoir interposed in the process fluid path between the process apparatus and the pump means, and in which the control system further comprises:

a level sensor for developing an electrical process fluid level signal having an amplitude indicative of the level of fluid in the reservoir;

a level reference circuit for developing a process fluid level reference signal of preset amplitude representative of a predetermined reservoir level;

and process fluid level comparator means for comparing the process fluid level signal and the process fluid level reference signal to develop a process fluid level cut-off signal indicative of a lack of adequate fluid in the reservoir;

the control circuit means being further coupled to the process fluid level comparator means, and including means for deactivating the compressor means and the pump means in response to the process fluid level cut-off signal.

14. A water chiller control according to claim 9, and further comprising:

a freezestat reference circuit for developing a freezestat reference signal representative of an incipient freezing temperature for the process fluid;

and a freezestat comparator means for comparing the process fluid temperature signal to the freezestat reference signal to develop a process fluid thermal cutoff signal indicative of a decrease of the process fluid temperature below the incipient freezing temperature;

the control circuit means further comprising means for deactivating the pump means and the compressor means in response to the thermal cutoff signal.

15. In a water chiller comprising:

a principal heat exchanger having first and second separate fluid paths extending therethrough in heat-exchanging relationship;

pump means for circulating process fluid through a process fluid path including, in series, a process apparatus and the first heat exchanger path;

and compressor means for circulating a refrigerant fluid through a refrigerant path including, in series, a condenser and the second heat exchanger path;

a control system comprising:

a process fluid pressure sensor;

a process fluid temperature sensor;

a refrigerant pressure sensor;

each sensor developing an electrical parameter signal having an amplitude indicative of the operating parameter sensed;

a process fluid pressure reference circuit;

a process fluid temperature reference circuit;

a refrigerant pressure reference circuit;

each reference circuit developing a reference signal representative of a predetermined value for the reference parameter;

a process fluid pressure comparator means;

a process fluid temperature comparator means;

a refrigerant pressure comparator means;

each comparator means comparing the associated parameter signal with the related reference signal to develop a cut-off signal indicative of a deviation of its parameter signal in a given sense from the related reference signal;

compressor control circuit means, coupled to each of the comparator means and to the compressor means, for deactivating the compressor means in response to any of the cut-off signals;

and pump control circuit means for deactivating the pump means in response to a cut-off signal from either of the process fluid pressure comparator means and the process fluid temperature comparator means.

16. A water control system according to claim 15 in a chiller further comprising an unloader bypass path, including an electrically operated unloader valve, bypassing the condenser in the refrigerant path, the control system further comprising:

an additional process fluid temperature reference circuit;

an additional comparator means for comparing the process fluid temperature signal with the additional process fluid reference signal to develop a process fluid temperature control signal indicative of a decrease of the process fluid temperature below the additional predetermined reference value;

and unloader control circuit means including means to open the unloader valve in response to the process fluid temperature control signal.

* * * * *